May 15, 1962 E. SAUER 3,034,411
PHOTOGRAPHIC CAMERA WITH COUPLED EXPOSURE METER
Filed Aug. 21, 1959 3 Sheets-Sheet 1

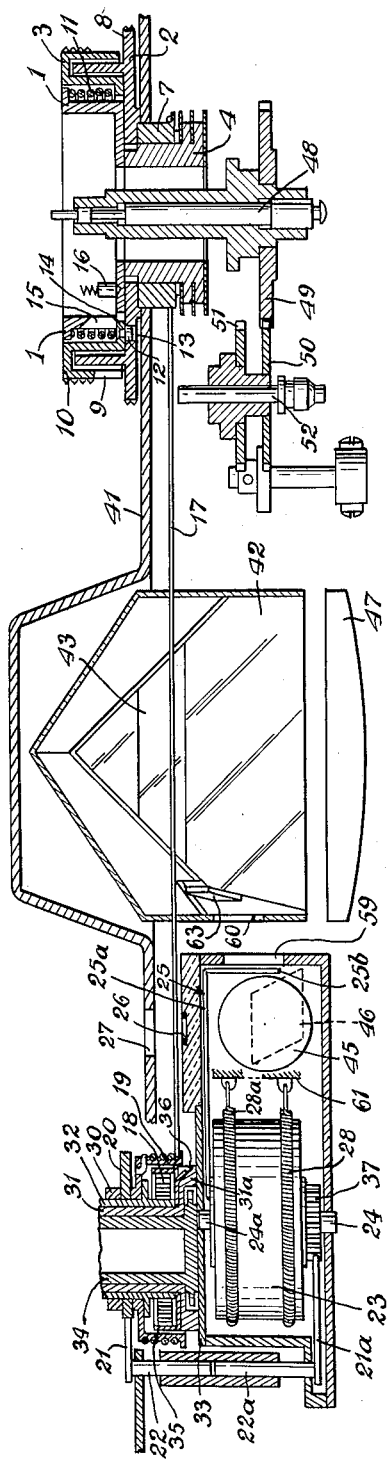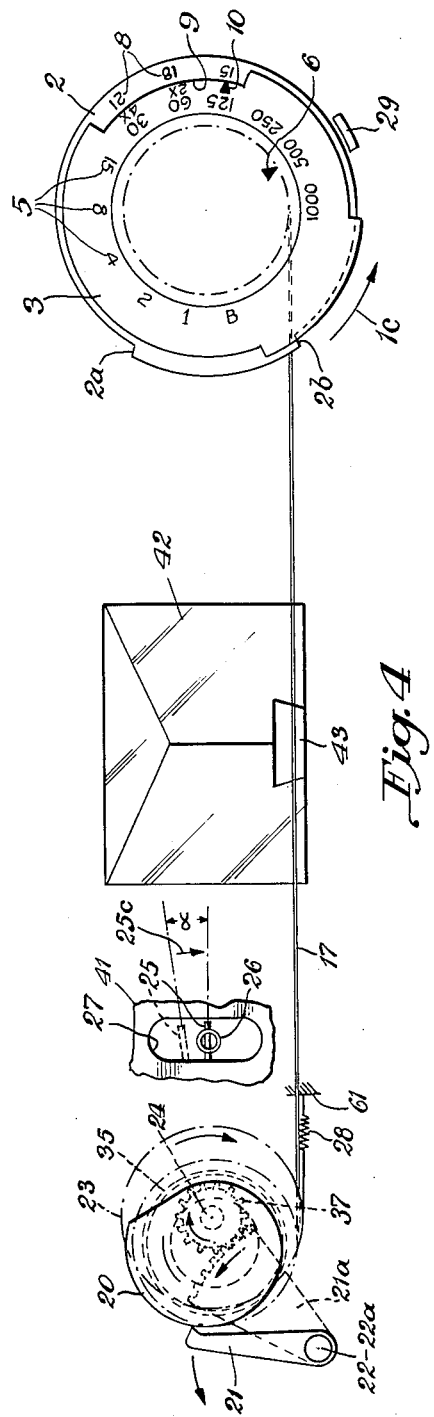

May 15, 1962  E. SAUER  3,034,411
PHOTOGRAPHIC CAMERA WITH COUPLED EXPOSURE METER
Filed Aug. 21, 1959  3 Sheets-Sheet 3
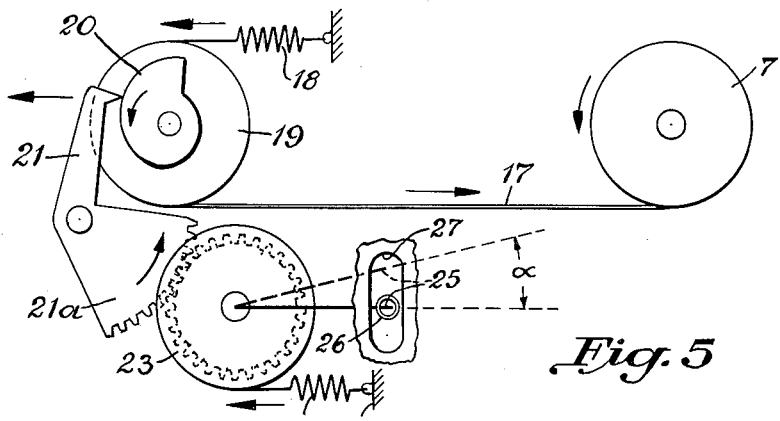
Fig. 5
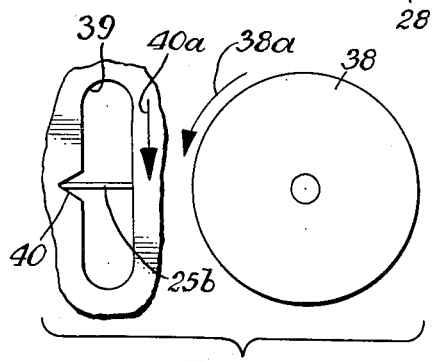
Fig. 6
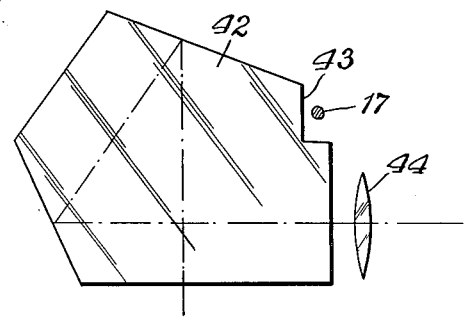
Fig. 7
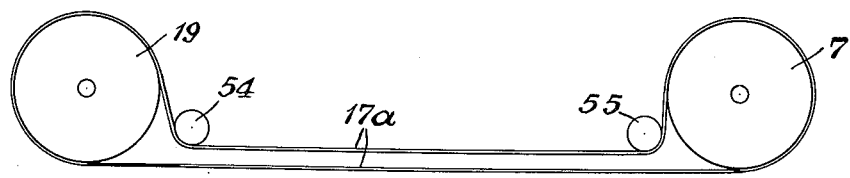
Fig. 8
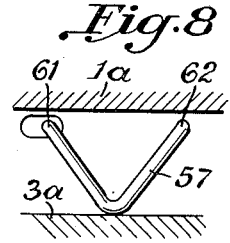
Fig. 9
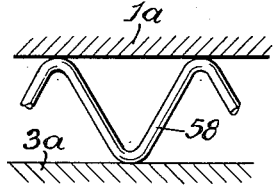
Fig. 10
Fig. 11

3,034,411
PHOTOGRAPHIC CAMERA WITH COUPLED EXPOSURE METER

Edgar Sauer, Stuttgart, Germany, assignor to Zeiss Ikon Aktiengesellschaft, Stuttgart, Germany
Filed Aug. 21, 1959, Ser. No. 835,317
7 Claims. (Cl. 95—10)

The invention relates to photographic cameras and particularly to single lens reflex cameras.

The photographic camera of the invention is provided with a built-in photoelectric exposure meter having an electrical measuring instrument of which the deflection of its pointer is influenced by an element, for instance, a resistance in the photo cell circuit or a diaphragm placed in front of the photo cell, which element is connected with one of the two exposure adjusting members, for instance the diaphragm adjusting device of the photographic objective, while the final adjustment of the camera is accomplished by a coupling connection of the other exposure adjusting member, for instance the shutter speed adjusting member, with the measuring instrument.

It is an object of the invention to arrange the exposure adjusting members in a camera of the above mentioned type and also the exposure meter on or at the upper wall of the camera casing and to make these members and the meter readable from above. Furthermore, the invention provides that one of the two exposure adjusting members, preferably the shutter speed adjusting member, is connected by a coupling element which extends along the top wall of the camera casing with the measuring instrument of the exposure meter.

The coupling element may consist of any substantially straight and continuous transmission member such as a link, a push rod, a rack bar or combinations of these elements, but preferably a cable transmission is used and when such a cable transmission is used, it is possible to employ a definite length of a piece of cable with its ends attached to the members to be connected with each other by means of the interposition of a power source, such as a spring in a spring casing, or such a power source may be eliminated entirely by employing an endless cable which is led over guide rollers.

In accordance with the invention, the diaphragm adjusting device and the reading device of the measuring instrument are arranged on the camera casing. Preferably, the diaphragm values are arranged on a rotatable ring which surrounds the photo electric cell mounted in the upper portion of the camera casing. The diaphragm adjusting device which is associated with the aperture in front of the photo electric cell is also arranged on the upper portion of the camera casing.

The present invention employs a curtain shutter for the purpose of determining the exposure time of the photographic film. The exposure time adjusting member is releasably coupled with the adjusting device for the film speed and is mounted within the operating knob of the film advancing mechanism and the shutter tensioning member. This operating knob is arranged at one end of the long and narrow top wall of the camera casing while the measuring instrument of the photo electric exposure meter is arranged at the other end of the top wall of the camera casing directly below the re-winding knob for the film. The coupling member, which consists preferably of a cable, extends along the top wall of the camera casing directly below the top wall, the center portion of which is raised for accommodating the finder, particularly the penta roof edge prism. In order to permit the passage of the cable through this upper center portion of the camera, the prism according to the invention is provided at its rear end with a cut-out.

The measuring instrument is preferably constructed in the form of a rearwardly rotatable instrument and the reading of the pointer takes place opposite a stationary index mark. In fact, two index marks are provided, namely one which is visible from above the camera and the other one is visible when looking into the finder. The last mentioned readability of the measuring instrument is obtained by projecting a bent portion of the indicator pointer of the measuring instrument by means of a penta roof edge prism into the finder to a place directly adjacent the finder image.

The arrangement of the operating members of the camera as provided in accordance with the invention and the readability of the measuring instrument of the exposure meter from above and from the rear of the camera casing by looking into the finder and also the arrangement of the coupling member results in an effective space saving arrangement which has the advantage particularly in single lens reflex cameras, that the latter are made very versatile in spite of the fact that single lens reflex cameras do not have very much space for accommodating all these desirable devices and particularly a coupled exposure meter. The employment of a cable drive in the present invention requires solely the arrangement of a few pulleys having a suitable diameter. Still the reliability of operation of a coupling arrangement between the camera adjustment members and the indicating instrument of an exposure meter by means of a cable, which is preferably made of steel wires or strands or of novel plastic materials, is extremely good and results in substantial advantages. The entire camera with all its accessories is extremely simple, requires little space and is very reliable in operation.

The novel features of the invention will now be described in connection with the embodiments disclosed in the following description with reference to the accompanying drawings.

In the drawings:

FIG. 3 illustrates a vertical sectional view lengthwise of the camera and viewed from the rear and disclosing the parts arranged in the upper portion of the camera casing.

FIG. 4 shows diagrammatically a top view of the parts illustrated in FIG. 3 and partly shows the adjusting members and the coupling element for the speed adjusting mechanism and the measuring instrument.

FIG. 5 illustrates diagrammatically a simplified view of the parts shown in FIG. 4.

FIG. 6 is a view of the window projected into the finder including the indicating pointer and the index mark used in connection with the diaphragm adjusting member.

FIG. 7 is a side elevation view of the penta roof edge prism and shows the position of the operating cable with respect thereto.

FIG. 8 illustrates diagrammatically a coupling connection employing an endless cable, and FIGS. 9, 10 and 11 show each arrangements of springs which may be used for the releasable coupling arranged between the shutter speed adjusting member and the member carrying the film speed scale.

Figure 1:
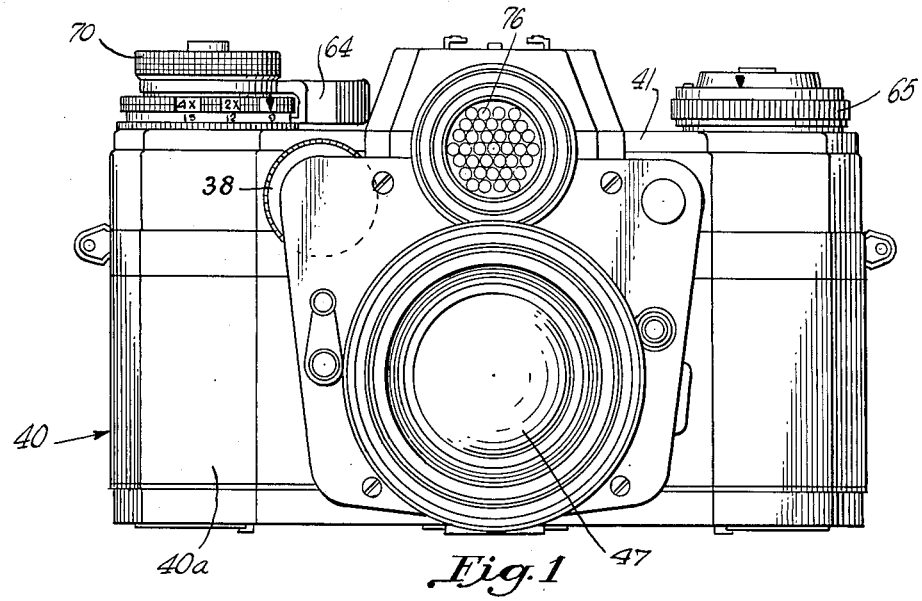
FIG. 1 is a front elevation view of the camera.
Figure 2:
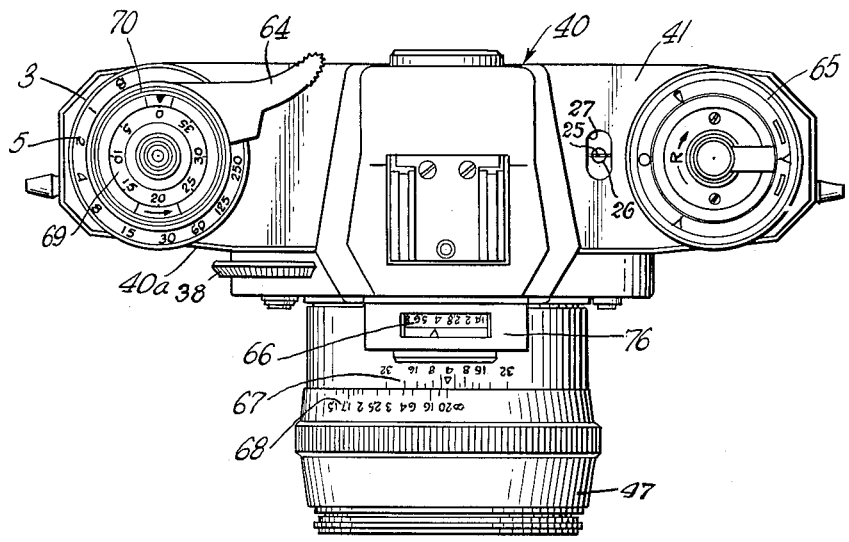
FIG. 2 is a top elevation view of the camera.

Referring to the FIGS. 1 and 2, the same disclose by way of example a single lens mirror reflex camera equipped with exposure control elements which in accordance with the invention are operatively coupled with a built-in exposure meter. The camera casing 40 is provided on its front wall 40a with a photographic objective 47 and a manually rotatable diaphragm adjusting member 38, while a photoelectric cell 76 is mounted directly above the objective 47. The narrow top wall 41 of the camera casing which extends horizontally and at right angles to the optical axis of the objective 47 is provided at the left hand end with the film advancing and shutter tensioning member 70 provided with a handle 64 adapted to be engaged by the thumb of the camera user. On the right hand end of the top wall 41 is arranged a film rewind knob 65. In coaxial arrangement with the film advancing and shutter tensioning member 70 are positioned the shutter speed adjusting and film speed adjusting members 1 and 2 (FIG. 3), while below the film rewind knob 65 the measuring instrument 23 (FIG. 3) for the exposure meter is arranged within the upper portion of the camera casing 40. Concentrically with respect to the film advancing and shutter tensioning member 70 (omitted in FIG. 3) are also arranged, as shown in FIG. 2, a film counter disc 69, a shutter speed scale 5 on the ring 3 and a film speed scale in the ring 2, as will be described hereinafter in more detail. All these scales can be readily read from above the camera and likewise the movable pointer 25 of the measuring instrument 23 and the fixed mark 26 cooperating therewith can be viewed from above the camera when looking into a window 27 in the camera top wall 41. Furthermore, the diaphragm scale 66, the depth of focus scale 67 and the distance scale 68, which are arranged on the mount for the photo electric cell and the mount for the objective 47, can be observed and read from above the camera.

Referring to FIG. 3, there is arranged on one end of the long and narrow camera top wall 41, namely at the shutter side, a shutter speed adjusting ring 1 which is arranged in coaxial relation with respect to a film speed adjusting ring 2. These two members 1 and 2 are releasably coupled with each other by a coupling member 3. The shutter speed adjusting ring 1 is rotatable and has fixedly attached thereto the control cams 4 for the shutter speeds. A shaft 48 is drivingly connected by a gear 49 with a gear 50 on the shaft 52. This shaft 52 carries also another gear 51. The shaft 52 is used for the drive of the first and second curtain of the curtain shutter, the details of which are not shown. The rotative movement of the gears 50 and 51 is transmitted to two shafts which in FIG. 3 are arranged one behind the other. Of these two shafts only the front shaft 52 is visible. These two shafts control the mechanism of the curtain shutter. When the shutter speed adjusting ring 1 is rotated, the shutter speed scale 5 is moved relatively to a stationary index mark 6. The film speed adjusting ring 2 has fixedly connected thereto a cable pulley 7 and may be adjusted relatively to the ring 1 by means of the coupling ring 3 corresponding to the number of the film speed intervals by lifting the ring 3 against the tension of a helical spring 11, which concentrically surrounds a cylindrical portion of the ring 1 and is arranged in an annular space formed between cylindrical portions of the rings 1 and 3. The film speed scale 8 (FIGS. 3 and 4) provided on the ring 2 may be read through a window 9 and can be adjusted relatively to an index 10 (FIG. 3).

When the coupling member 3 is raised against the tension of the spring 11, a latch bolt 12 is withdrawn from one of the apertures 13 arranged at the interval divisions in the ring 2. A projection 14 on the member 3 is slidable in a recess 15 of the cylindrical portion of the ring 1 and the latter can now be adjusted relatively to the film speed adjusting ring 2. The shutter speed adjusting ring 1 is adapted to be locked in each speed interval by means of a spring actuated bolt 16. The film speed adjusting ring 2 is provided with stop shoulders 2a and 2b adapted to engage a stationary stop 29.

FIG. 3 illustrates particularly the arrangement of the new adjusting members of the invention. One end of a cable 17 is fixedly attached to the cable pulley 7. The cable 17 is connected with an exposure meter arranged at the opposite side of the camera in the upper portion of the camera casing. It is possible, however, to employ other transmission means in place of the cable 17 which is kept tensioned by a spiral spring 18. By means of suitably arranged guide rollers 54 and 55 one may also employ an endless cable 17 as shown in FIG. 8.

Approximately in the center of the upper wall of the camera casing is arranged a penta roof edge prism 42 which is provided as shown in FIG. 5 with a cut-out 43 for permitting the passage of the cable 17. The movable pointer 25 of the measuring instrument 23 of the exposure meter is provided with a horizontal portion 25a and also with a vertical portion 25b and is made visible through optical means 45, 46 and 63 not only from above but also by means of the penta roof edge prism 42, into which an image of the pointer is projected, from the side by looking into the finder. The pointer and its image are cooperating with a stationary indicating mark 26 or 40 respectively. A field lens 47 is provided for the purpose of increasing the brightness of the finder image.

For the passage of measuring rays are provided the apertures 27, 59 and 60. When the coupled members 1, 2 and 3 on the shutter side of the camera casing are rotated counter clockwise, the cable 17 tensions a return spring 18 and a drum 19 which is provided with an adjustable, but normally fixedly mounted exposure meter control cam 20 thereon, is positively rotated. The non-linearity of the indication of the measuring instrument is compensated for by the shape of the cam 20. The cam 20 is fixedly attached to the drum 19 by a ring nut 30. These parts are supported by an intermediate sleeve 32 which is supported on an inner sleeve 31 fixedly attached with a flange to the cover casing 33.

The gear 34a on the lower end of sleeve 34 constitutes a portion of the film rewinding device and has no operative connection whatsoever with the exposure meter.

The spiral spring 18 is arranged in a stationary spring casing 35 and the latter is secured against rotation by means of a projection 36 engaging a notch in the flange 31a of the sleeve 30. The outer end of the spring 18 is attached to the casing 35 and the inner end of the spring 18 is attached to the rotatable intermediate sleeve 32. When the sleeve 32 is rotated counter clockwise (to obtain shorter exposure times), the spring 18 has to be tensioned. A tracer lever 21 which engages the exposure meter control cam 20 is rotated about the axis of its bearing shaft 22 and effects by means of its sector-shaped toothed portion 21a and the gear 37 meshing therewith a rotation of the measuring instrument 23 of the exposure meter about its bearing pins 24, 24a. When the drum 19 is turned to the left as a result of the action of the cable 17, not only the spring 18 is tensioned by means of the parts 20, 21a and 23, but also the instrument return springs 28 and 28a are tensioned. The springs 28 and 28a are attached with one of their ends to the circumference of the measuring instrument casing and the other ends of these springs 28, 28a are fixedly attached to the casing of the exposure meter by means of a contact bar 61.

The instrument pointer 25 which is fixedly attached to the moving coil of the measuring instrument follows the mechanical rotative movement of the instrument and when the adjustment has been made correctly between the diaphragm aperture and the exposure time, the instrument pointer will be in registration with the index marks 26 and 40 respectively (FIGS. 4 to 6). The pointer 25 and the index mark 26 are visible through a window 27.

Referring to FIG. 4, it will be noted that the shutter speed has been adjusted to 1/500 sec. The camera has been adjusted for a film speed of 15/10 DIN. In this particular embodiment of the invention each interval of the shutter speed scale and the film speed scale is equal to 25°30′. Of course, this angle may have any other desired size, except that the same angle will have to be used in both the shutter speed scale and the film speed scale.

If now the coupled members 1, 2 and 3 are to be rotated for instance to a speed of 1/1000 sec., the rotation should be counter clockwise about one interval so that the figure 1000 will be opposite the index mark 6. When this is being done, the cable 17 at the same time rotates the drum 19 and the spring 18 will be tensioned. The cam 20 is also rotated an angle of 25°30′, considering the fact that the cable transmission has been selected to be 1:1. Of course, the transmission ratio may be changed according to the particular construction. During this rotation the cam 20 engages with a continuously increasing cam portion the end of the tracing lever 21 and urges this lever outwardly and by means of the parts 22, 22a and 21a the gear 37 and also the entire measuring instrument 23 is rotated in clockwise direction and as a result the springs 28 and 28a are being tensioned.

The deflection α of the pointer 25 depends upon the amount of light which passes through the iris diaphragm onto the photo electric cell. A maximum size of the aperture of the iris diaphragm and a maximum amount of light will result in the largest deflection α of the pointer or, in other words, the measuring instrument has to be rotated rearwardly about this angle until the pointer 25 comes into registration with the fixed index mark 26. According to FIG. 4, a left hand counter clockwise rotation will result in short exposure times, whereby the measuring instrument 23 performs a right hand (clockwise) rotation in order that the pointer 25 may be moved toward the index mark 26.

When exposure times of longer duration are selected (FIG. 4) which are to be obtained by rotating the members 1, 2, 3 in clockwise direction, then the tension springs 18, 28 and 28a take over in the reverse direction the rotative movement of the parts 23, 21a, 21, 20, 19 and 17. The measuring instrument pointer 25 moves against the direction indicated by the arrow 25c, namely from below in an upward direction.

If it is desired to change the film speed from the position indicated in FIG. 4, then it is necessary to raise the member 3 and the ring 2 has then to be rotatably adjusted to the desired film speed. If one makes an adjustment from 15/10 to 18/10 DIN or, in other words, if one adjusts the camera for a higher film speed, then the shutter speed may be shorter. If at the initial position 15/10 DIN the shutter speed was 1/500 sec. and the pointer 25 was in registration with the index mark 26, then the adjustment to a higher film speed 18/10 DIN would result in a moving of the pointer 25 in opposite direction to the arrow 25c, namely upwardly. In order to bring the pointer 25 into registration with the index 26, it is necessary to rotate the shutter speed adjusting ring 1 one interval in the direction of the arrow 1c, namely toward the left (counter clockwise) so that the shutter speed of 1/1000 sec. will be placed opposite the index 26, in other words, the exposure time has been shortened. An adjustment of the film speed from 15/10 to 12/10 DIN would result in a reverse adjustment of the shutter speed adjusting ring 1. FIG. 5 illustrates diagrammatically this exposure time coupling.

An image of the instrument pointer 25 is projected by means of the roof edge prism 42 into the finder space and appears adjacent the finder image at the right hand side thereof. A window 39 with an image of the indicator 25 and the adjusting mark 40 is illustrated in FIG. 6. The illustrated circular diaphragm adjusting member 38 is arranged on the front wall of the camera casing adjacent the top wall thereof (FIGS. 1, 8, 2) and when the camera is ready for use and when viewed from the rear, the window 39 will be located to the left of this member 38. By means of a left hand or anti-clockwise rotation in the direction of the arrow 38a of the member 38 the aperture of the photo electric cell diaphragm is moved toward closed position and a certain amount of light is kept away from the photo electric cell. As a result the deflection of the pointer 25 becomes smaller and the pointer 25 moves downwardly toward the mark 40 as shown by the arrow 40a. The same movement of the pointer 25 is also visible from the outside and from above the camera when looking into the window 27 in the top wall of the camera casing. The rotary adjusting member 38 does not only adjust the aperture of the iris diaphragm in front of the photo electric cell, but at the same time adjusts in the same direction the aperture of the diaghragm mounted in the photographic objective 47.

In this embodiment of the invention particular attention was paid to the fact that the rotative movements of the adjusting members and the instrument indicator take place in the same direction.

The photo electric cell and the iris diaphragm positioned in front of the same influence the measuring instrument, and in accordance with the amount of light energizing the photo electric cell the pointer 25 of the measuring instrument makes a corresponding deflection. The position of circular adjusting member 38 is only diagrammatically illustrated in FIG. 6 and is intended to show solely the direction of rotation of the member 38 in connection with the deflection of the pointer 25. The FIGS. 1 and 2 show the actual location of the member 38 with respect to the camera casing and the other parts of the camera.

FIG. 7 illustrates a side elevation view of the penta roof edge prism 42 and the cable 17 which latter is illustrated in cross section. It is apparent from FIG. 7 that the cable 17 moves in the cut-out 43 provided in the prism 42. This cut-out 43 is arranged on the right hand side of the prism at a place where the removed portion of the prism is not important for the formation of the finder image. 44 indicates the ocular of the finder.

FIG. 8 illustrates diagrammatically the arrangement of a transmission when an endless cable 17a is employed. In this last named arrangement it is not necessary to employ the spring 18 in its casing 35 which in the first described embodiment is arranged at a place in the camera where the exposure meter is arranged.

The operation of the shutter speed adjusting device and of the film speed adjusting device in each direction of rotation is uniform (FIG. 8), because the formerly employed spring and its tension is no longer necessary. However, there are employed the guide rollers 54 and 55.

The FIGS. 9, 10 and 11 illustrate particularly effective spring constructions for the releasable coupling between the shutter speed adjusting ring 1 and the coupling member 3 for the film speed adjusting device. These springs may be used in place of the spring 11 employed in the embodiment of the invention shown in FIG. 3. In these figures, the shutter speed adjusting ring is indicated with 1a and the coupling member with 3a. Between these two member 1a and 3a are arranged according to FIGS. 9 and 11 spreader springs. In the FIGS. 9 and 10 there are arranged a number of spreader springs 56 and 57 which are distributed in the annular space formed between the members 1a and 3a. The ends of these springs are supported at the points 59, 60, 61 and 62. In FIG. 11, however, is employed a helical spring 58 which extends circumferentially along the annular space between the members 1a and 3a.

The modifications of the springs 56, 57 and 58 shown in the FIGS. 9, 10 and 11 have the advantage that compared with FIG. 2 these springs have a greater stiffness and, therefore, a somewhate more reliable operation of the releasable coupling between the shutter speed adjusting member and the film speed adjusting member is obtained.

What I claim is:

1. In a photographic camera provided with a camera casing, a photographic objective on the front wall of said casing, and a built-in photoelectric exposure meter having a rotatably mounted electrical measuring instrument with a pivotally mounted pointer, said camera casing having a narrow top wall extending at right angles to the optical axis of said objective, at least two exposure adjusting members mounted adjacent said top wall, means for mounting said measuring instrument adjacent said top wall and within said camera casing and to one-side of said optical axis, means for permitting a viewing of said pointer from above said camera casing, a single mechanical coupling member extending parallel to said top wall and connecting one of said exposure adjusting members, which is arranged on the other side of said optical axis, with said measuring instrument for rotatable adjustment of the latter, and means for operatively connecting the other exposure adjusting member with said measuring instrument to adjust the deflection of said pointer to a predetermined fixed index mark.

2. In a photographic camera provided with a camera casing, a photographic objective on the front wall of said casing and a built-in photoelectric exposure meter having an electrical measuring instrument with a pivotally mounted pointer, said camera casing having a narrow top wall extending at right angles to the optical axis of said objective, a shutter speed adjusting member mounted on one end of said top wall, means for movably mounting said measuring instrument directly below said top wall and at the other end thereof, a window in said top wall for viewing said pointer from above, a coupling member extending parallel to said top wall and connecting said shutter speed adjusting member with said measuring instrument for adjustment of the latter, a diaphragm adjusting member mounted on the front wall of said camera casing adjacent said top wall and above said objective, and means for operatively connecting said diaphragm adjusting member with said measuring instrument for adjusting the deflection of said pointer to a predetermined fixed index mark.

3. In a photographic camera provided with a camera casing, a photographic objective on the front wall of said casing, and a built-in photoelectric exposure meter having an electrical measuring instrument with a pivotally mounted pointer, said camera casing having a narrow top wall extending at right angles to the optical axis of said objective, at least two exposure adjusting members mounted adjacent said top wall, means for movably mounting said measuring instrument adjacent said top wall and within said camera casing, means for permitting a viewing of said pointer from above said camera casing, a force transmitting cable extending lengthwise of said top wall and connecting one of said exposure adjusting members with said measuring instrument for adjustment thereof, and means for operatively connecting the other exposure adjusting member with said measuring instrument to adjust the deflection of said pointer to a predetermined fixed index mark.

4. In a photographic camera provided with a camera casing, a photographic objective on the front wall of said casing, and a built-in photoelectric exposure meter having an electrical measuring instrument with a pivotally mounted pointer, said camera casing having a narrow top wall extending at right angles to the optical axis of said objective, at least two exposure adjusting members mounted adjacent said top wall, means for movably mounting said measuring instrument adjacent said top wall and within said camera casing, means for permitting a viewing of said pointer from above said camera casing, a force transmitting cable of predetermined length extending lengthwise of said top wall and connecting one of said exposure adjusting members with said measuring instrument for adjustment thereof by means of interposing at one end of said cable a power storing means, and means for operatively connecting the other exposure adjusting member with said measuring instrument to adjust the deflection of said pointer to a predetermined fixed index mark.

5. In a photographic camera provided with a camera casing, a photographic objective on the front wall of said casing, and a built-in photoelectric exposure meter having an electrical measuring instrument with a pivotally mounted pointer, said camera casing having a narrow top wall extending at right angles to the optical axis of said objective, at least two exposure adjusting members mounted adjacent said top wall, means for movably mounting said measuring instrument adjacent said top wall and within said camera casing, means for permitting a viewing of said pointer from above said camera casing, a force transmitting endless cable extending lengthwise of said top wall and connecting one of said exposure adjusting members with said measuring instrument for adjustment thereof, and means for operatively connecting the other exposure adjusting member with said measuring instrument to adjust the deflection of said pointer to a predetermined fixed index mark.

6. A photographic camera as claimed in claim 2, including a film advancing and shutter tensioning knob arranged at one end of said top wall, means for mounting said shutter speed adjusting member together with a film speed adjusting member in coaxial relation with said film advancing and shutter tensioning knob, and means for releasably coupling said shutter speed adjusting member to said film speed adjusting member.

7. A photographic camera as claimed in claim 2, including a film advancing and shutter tensioning knob arranged at one end of said top wall, means for mounting said shutter speed adjusting member together with a film speed adjusting member in coaxial relation with said film advancing and shutter tensioning knob, means for releasably coupling said shutter speed adjusting member to said film speed adjusting member, a film rewind knob mounted at the other end of said top wall, means for mounting said measuring instrument below said film rewind knob, said coupling member comprising a force transmitting cable which connects said film speed adjusting member with said measuring instrument to adjust the same.

References Cited in the file of this patent

UNITED STATES PATENTS

| | | |
|---|---|---|
| 2,199,464 | Kuppenbender | May 7, 1940 |
| 2,209,156 | Fischer | July 23, 1940 |
| 2,242,043 | Sanger | May 13, 1941 |
| 2,250,898 | Tonnies | July 29, 1941 |